United States Patent [19]

Eppler

[11] 4,388,118

[45] Jun. 14, 1983

[54] BLACK PIGMENT FREE OF HEAVY METALS

[75] Inventor: Richard A. Eppler, Timonium, Md.

[73] Assignee: Mobay Chemical Corporation, Pittsburgh, Pa.

[21] Appl. No.: 357,959

[22] Filed: Mar. 15, 1982

[51] Int. Cl.³ .............................................. C09C 1/02
[52] U.S. Cl. .................................... 106/306; 106/304
[58] Field of Search .............................. 106/304, 306

[56] References Cited

U.S. PATENT DOCUMENTS 3,874,883 4/1975 Robitaille et al. ................... 106/306
4,156,613 5/1979 Hund et al. .......................... 106/306

Primary Examiner—Mark Bell
Attorney, Agent, or Firm—Gene Harsh; Joseph C. Gil; Lyndanne M. Whalen

[57] ABSTRACT

An inorganic black pigment is made by calcining raw materials such as manganese dioxide, manganese carbonate, strontium carbonate or calcium carbonate. The product is a perovskite structure made up of (a) 25–84 mol % of a manganese oxide and (b) 75–16 mol % SrO and/or CaO plus residual carbonates and mineralizers. The thus-produced black pigment is particularly advantageous in that it contains no heavy metals or highly toxic material and that it has very low oil absorption and high tinting strength.

5 Claims, No Drawings

BLACK PIGMENT FREE OF HEAVY METALS

BACKGROUND OF THE INVENTION

This invention relates to a black pigment, a process for making such a pigment and paints and/or plastics containing this pigment.

Heat stable black pigments which contain no carbon have generally been made from materials containing heavy metals and/or other highly toxic materials. Such materials are described, for example, in the Colour Index published in Great Britain and the brochure entitled "Classification and Chemical Descriptions of Mixed Metal Oxide Inorganic Colored Pigments" published by the Dry Color Manufacturers' Association, 1117 North 19th Street, Suite 100, Arlington, Va., 22209. These heavy metal-containing and/or highly toxic materials are, however, undesirable in many applications.

SUMMARY OF THE INVENTION

It is an object of the present invention to provide an inorganic black pigment in which no heavy metal-containing or highly toxic material is present.

It is also an object of the present invention to provide an inorganic black pigment useful in making paints, organic coatings and plastics which is capable of withstanding a curing cycle at temperatures of 500° to 1000° F.

It is another object of the present invention to provide an inorganic black pigment having very low oil absorption and high tinting strength.

These and other objects which will become apparent to those skilled in the art are achieved by calcining a mixture which includes a source of an oxide of manganese and a source of strontium oxide and/or calcium oxide. This calcination produces one of two distorted perovskite phases, both of which are black.

DETAILED DESCRIPTION OF THE INVENTION

The inorganic pigment of the present invention may be made from raw materials such as manganese dioxide, manganese carbonate, strontium carbonate, calcium carbonate, and the like. The amount of raw material employed is naturally dependent upon the composition of the specific raw material. However, the quantity of material must be such that upon calcination, the product composition is within the ranges given in detail below. Upon being calcined at high temperature, these raw materials are converted into a distorted perovskite structure in which (a) manganese oxide or manganese dioxide and (b) strontium oxide and/or calcium oxide are present in the proper proportions. Appropriate calcination temperatures are generally between 1200° and 1900° F., preferably about 1300° to 1700° F. In actual production, saggers are typically used for the calcination but any device or apparatus capable of withstanding the calcination temperature may be employed.

The products of this calcination are useful as pigments which impart an intense black coloration to paints and other organic coatings. The pigment is also useful for coloring plastics. It is particularly useful in the formulation of materials which must withstand a curing cycle at temperatures of 500° to 1000° F.

The perovskite pigment of the present invention exhibits black coloration and has the following broad oxide composition:
25 to 84 mol % of an oxide of manganese and
75 to 16 mol % of strontium oxide and/or calcium oxide.

In addition to these oxides, small amounts of conventional mineralizers such as alkali halides, alkaline earth halides, boric acid, etc., may be included in the raw materials to facilitate the calcination reaction.

When strontium oxide is used as the alkaline earth oxide, the preferred oxidic composition is:
60 to 78 mol % of a manganese oxide
22 to 40 mol % strontium oxide together with any conventional mineralizers such as those described above.

When calcium oxide is the alkaline earth oxide used, the preferred composition is:
38 to 52 mol % of an oxide of manganese
48 to 62 mol % calcium oxide in addition to any conventional mineralizers such as those described above.

Up to 10 mol % of iron oxide, cobalt oxide, or vanadium oxide may be substituted for manganese in these compositions. However, unless done carefully, green or brown colors will result. For similar reasons, incidental impurities of about 3 to 5 mol % are usually considered the limits of toleration in these black pigments.

When the concentration of manganese oxide or manganese dioxide deviates from the required limits on either the high or low side, brown pigments result. For similar reasons, excessive concentrations of impurities yield colors other than black and are undesirable.

With respect to other black pigments currently available, the pigment of the present invention has a number of unique properties. First, the oil absorption is very low, thereby enabling very efficient usage of pigment. Additionally, the product of the present invention has a high tinting strength and yields a very neutral gray when combined with titanium dioxide.

Having thus described my invention, the following examples are given by way of illustration. The percentages given are mol percents unless otherwise indicated.

EXAMPLES

EXAMPLE 1

A batch was compounded from 450.5 grams of strontium carbonate, 249.5 grams of manganese carbonate, 9.9 grams of potassium fluoride, 9.9 grams of sodium chloride, and 9.9 grams of ammonium bifluoride. This batch was weighed out, blended, and calcined in a sagger in a gas-fired kiln at 1350° F. for 3 hours. After calcining and cooling to room temperature, the calcined pigment was removed from the sagger, broken up, pulverized, and then fluid energy milled. The pigment had the following molar formulation: 60% strontium oxide, 40% manganese dioxide, and residual amounts of carbonate and mineralizers.

X-ray diffraction analysis of this material showed it to be a distorted perovskite. The oil absorption of the pigment was measured in accordance with ASTM Procedure D-281 and found to be 11.9 grams. The pH was measured in accordance with ASTM Procedure D-1208 and found to be 9.0.

To evaluate the color of this pigment in a paint, 10.0 grams of the pigment were added to 14.0 grams of soya oil alkyd resin, 16.5 grams of mineral spirits, 2.4 grams of naphtha, and 0.13 grams of driers. This mixture was placed on a paint shaker and shaken for 30 minutes with 30 grams of beads. The paint was then strained and 0.3 cc of additional driers were added. The paint was drawn down on a 0.006-inch Bird applicator and was allowed to air dry for at least 24 hours. The color was then measured on a Diano-Hardy Visible Spectrophotometer and the results were as follows: $R_d=5.0$, $a=0.2$, $b=0.6$. In this system of color measurement, a black is indicated by an $R_d$ value of less than about 6.0 and "a" and "b" values less than about 1.5 in absolute value.

To further evaluate the color of the pigment, 5.0 grams of the pigment and 5.0 grams of pigment-grade titanium dioxide were prepared in a paint formulation otherwise similar to the one given above. The color of this 1:1 formulation was measured as follows: $R_d=27.6$, $a=0.4$, $b=1.2$. In this system the neutrality of the formulation is indicated by the extent to which the "a" and "b" values do not increase in absolute value. The $R_d$ value increases as the color goes from a black to a gray.

EXAMPLE 2

A batch was compounded from 1304.0 grams of strontium carbonate, 2526.0 grams of manganese carbonate, 57.6 grams of ammonium bifluoride, 56.2 grams of potassium fluoride, and 56.0 grams of sodium chloride. This batch was weighed out, blended, and calcined in a sagger in a gas-fired kiln at a temperature of 1570° F. for 3 hours. After calcining and cooling to room temperature, the calcined pigment was removed from its sagger, broken up, pulverized, and then fluid energy milled. The product pigment had the following molar formulation:

30% strontium oxide,
70% manganese oxide, plus residual amounts of carbonate and mineralizers. The crystal phases, as measured by X-ray diffraction, were a mixture of two distorted perovskites. The oil absorption of this pigment was then measured in accordance with ASTM Procedure D-281 and found to be 23.8 grams.

To evaluate the color of this pigment in a paint formulation, 10.0 grams of the pigment were mixed with 14.0 grams of soya oil alkyd resin, 16.5 grams of mineral spirits, 2.4 grams of naphtha, and 0.13 grams of driers. This mixture was placed in a paint shaker and shaken for 30 minutes with 30 grams of beads. The paint was then strained and 0.3 cc of additional driers were added. The paint was then drawn down on a 0.006-inch Bird applicator and allowed to air dry for at least 24 hours. The color was measured on a Diano-Hardy Visible Spectrophotometer and found to be: $R_d=4.7$, $a=0.2$, $b=0.5$.

To further evaluate the color of the pigment, 5.0 grams of the pigment were mixed with 5.0 grams of pigment-grade titanium dioxide to produce a paint formulation otherwise identical to that described above. The paint prepared therefrom had the following color values: $R_d=17.7$, $a=-0.5$, $b=-3.7$.

EXAMPLES 3–15

Batches having the compositions given in Table 1 were each weighed out, blended and calcined in a sagger in a gas-fired kiln. The batches used in Examples 3–12 and 14–15 were calcined at 1700° F. for 3 hours. The batch used in Example 13 was calcined at 1300° F. for 3 hours. After calcining and cooling to room temperature, each of the calcined pigments was removed from the sagger, broken up, pulverized, and then fluid energy milled. Aside from residual amounts of volatile carbonate and mineralizers, the calcined pigments had the molar compositions given in Table II. The phases present were determined by X-ray diffraction to be one or more distorted perovskites. The oil absorptions as measured by ASTM Procedure D-281 were those given in Table III.

In order to evaluate the color of each of these pigments in a paint formulation, 10.0 grams of each pigment were mixed with 14.0 grams of soya oil alkyd resin, 16.5 grams of mineral spirits, 2.4 grams of naphtha, and 0.13 grams of driers. Each of these paints was then placed on a paint shaker and shaken for 30 minutes with 30 grams of beads. The paints were then strained and 0.3 cc of additional driers were added to each formulation. The paints were then drawn down on a 0.006-inch Bird applicator and allowed to air dry for at least 24 hours. The color properties were measured on a Diano-Hardy Visible Spectrophotometer and the results are given in Table III.

TABLE 1

| Raw Material (gms) | RAW BATCHES PREPARED EXAMPLES | | | | | | | | | | | | |
|---|---|---|---|---|---|---|---|---|---|---|---|---|---|
| | 3 | 4 | 5 | 6 | 7 | 8 | 9 | 10 | 11 | 12 | 13 | 14 | 15 |
| Strontium Carbonate | 160.9 | 153.5 | 263.3 | 126.0 | 216.5 | 153.5 | — | 77.8 | 55.3 | — | — | 84.5 | 69.2 |
| Calcium Carbonate | — | — | — | — | — | 53.8 | 185.6 | — | — | 170.1 | 52.3 | — | 9.7 |
| Manganese Carbonate | 89.1 | 83.2 | 72.9 | 209.2 | 107.9 | 127.7 | 147.1 | 161.5 | 183.8 | 67.3 | 186.0 | 116.9 | 158.7 |
| Potassium Fluoride | — | — | 4.5 | 4.9 | 4.7 | 5.0 | 5.7 | 3.5 | 3.6 | 4.2 | 3.9 | 3.6 | 3.6 |
| Sodium Chloride | — | — | 4.6 | 4.9 | 4.7 | 5.0 | 5.7 | 3.5 | 3.6 | 4.2 | 3.9 | 3.7 | 3.6 |
| Ammonium Bifluoride | — | — | 4.6 | 5.0 | 4.8 | 5.1 | 5.9 | 3.6 | 3.7 | 4.3 | 4.0 | 3.7 | 3.7 |
| Boric Acid | — | 8.8 | — | — | — | — | — | — | — | — | — | — | — |
| Ammonium Metavanadate | — | — | — | — | 11.5 | — | — | — | — | — | — | 22.4 | — |
| Ferric Oxide | — | — | — | — | — | — | — | — | — | — | — | 15.2 | — |
| Cobalt Oxide | — | — | — | — | — | — | — | — | — | — | — | — | 1.6 |

TABLE II

MOLAR FORMULAS OF PIGMENTS (IN MOL PERCENT)

| Oxide | EXAMPLES | | | | | | | | | | | | |
|---|---|---|---|---|---|---|---|---|---|---|---|---|---|
| | 3 | 4 | 5 | 6 | 7 | 8 | 9 | 10 | 11 | 12 | 13 | 14 | 15 |
| SrO | 60.0 | 60.0 | 75.0 | 33.3 | 60.0 | 40.0 | — | 28.6 | 20.0 | — | — | 33.3 | 25.0 |
| CaO | — | — | — | — | — | 20.0 | 60.0 | — | — | 75.0 | 25.0 | — | 5.0 |
| $MnO_2$ | 40.0 | 40.0 | 25.0 | 66.7 | 36.0 | 40.0 | 40.0 | 71.4 | 80.0 | 25.0 | 75.0 | 55.5 | 69.0 |
| $VO_2$ | — | — | — | — | 4.0 | — | — | — | — | — | — | 5.6 | — |
| $Fe_2O_3$ | — | — | — | — | — | — | — | — | — | — | — | 5.6 | — |
| CoO | — | — | — | — | — | — | — | — | — | — | — | — | 1.0 | plus residual amounts of carbonate and mineralizers

TABLE III

PROPERTIES OF PIGMENTS

| | EXAMPLES | | | | | | | | | | | | |
|---|---|---|---|---|---|---|---|---|---|---|---|---|---|
| | 3 | 4 | 5 | 6 | 7 | 8 | 9 | 10 | 11 | 12 | 13 | 14 | 15 |
| Oil Absorption | — | — | 15.6 | 20.2 | 17.4 | 19.3 | 19.3 | 23.8 | 21.1 | 37.6 | 28.4 | 18.3 | 22.9 |
| Color In Masstone | | | | | | | | | | | | | |
| $R_d$ | 4.6 | 5.3 | 5.3 | 4.6 | 5.4 | 5.2 | 5.0 | 4.5 | 4.7 | 4.9 | 4.6 | 4.6 | 4.4 |
| a | 0.3 | 1.3 | 0.3 | 0.2 | 0.7 | 0.9 | 0.0 | 0.1 | 0.4 | 0.5 | 0.4 | 0.1 | 0.2 |
| b | 0.4 | 1.7 | 1.6 | 0.1 | 1.4 | 1.4 | 0.4 | 0.0 | 0.5 | 1.1 | 0.6 | −0.1 | 0.0 |

What is claimed is:

1. An inorganic black pigment having a distorted perovskite structure in which the net oxide composition after calcination at a temperature between 1200° and 1900° F. consists essentially of (a) 25 to 84 mol % of an oxide of manganese and (b) 75 to 16 mol % strontium oxide and/or calcium oxide, together with residual amounts of carbonates and/or mineralizers.

2. The inorganic black pigment of claim 1 in which (a) 25 to 84 mol % manganese dioxide and (b) 75 to 16 mol % strontium oxide and/or calcium oxide are present.

3. The inorganic black pigment of claim 1 in which 22 to 40 mol % strontium oxide and 60 to 78 mol % manganese oxide are present.

4. The inorganic black pigment of claim 1 in which 48 to 62 mol % calcium oxide and 38 to 52 mol % manganese dioxide are present.

5. The inorganic black pigment of claim 1 in which up to 10 mol % of the manganese oxide has been replaced by iron oxide, cobalt oxide or vanadium oxide.

* * * * *